UNITED STATES PATENT OFFICE.

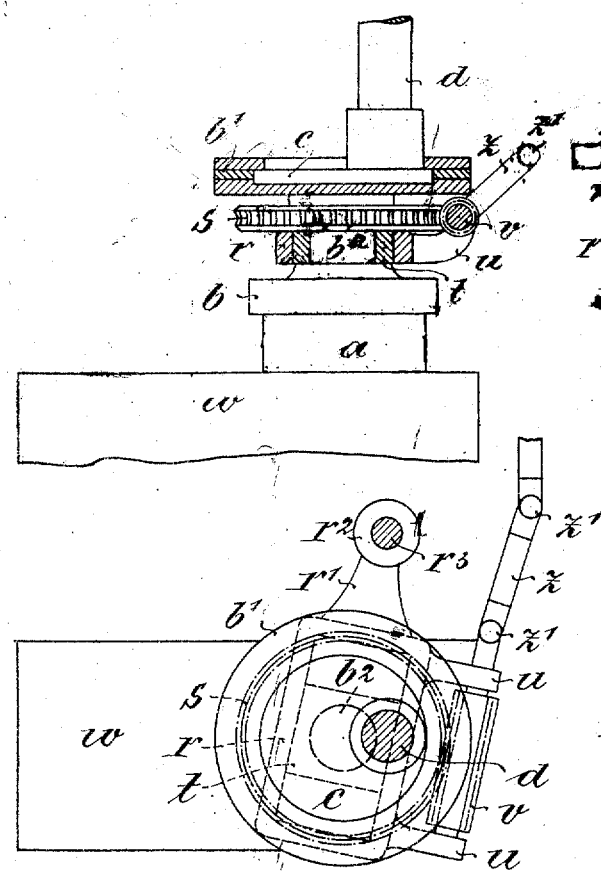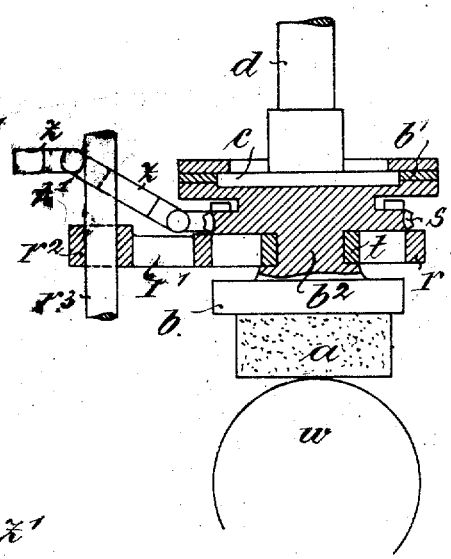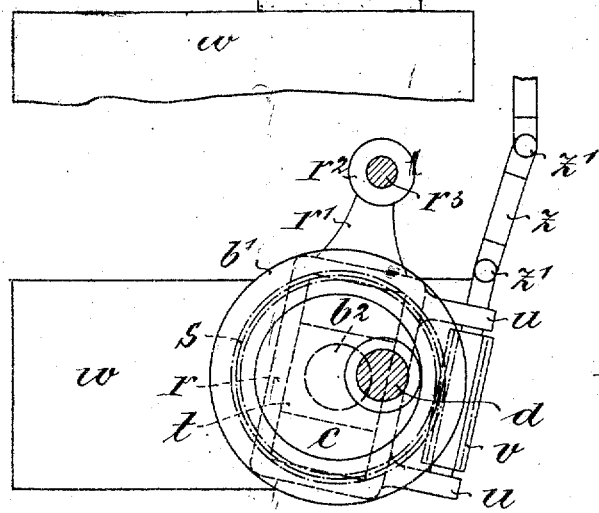

CARL BLECHER, OF BERLIN-DAHLEM, GERMANY, ASSIGNOR TO ROTOPHOT AKT. GES. FÜR GRAPHISCHE INDUSTRIE, OF BERLIN, GERMANY.

DEVICE FOR GRINDING CYLINDRICAL ROTATING BODIES BY MEANS OF A PLANE GRINDING-TOOL.

1,208,278.     Specification of Letters Patent.     Patented Dec. 12, 1916.

Application filed December 4, 1914. Serial No. 875,549.

*To all whom it may concern:*

Be it known that I, CARL BLECHER, subject of the King of Prussia, residing at Friedbergstrasse 23, Berlin-Dahlem, Germany, have invented certain new and useful Improvements in Devices for Grinding Cylindrical Rotating Bodies by Means of a Plane Grinding-Tool, of which the following is a specification.

My invention relates to devices for grinding cylindrical rotating bodies by means of a plane grinding tool.

The object of my invention is to provide a device of this kind which will grind or polish cylindrical bodies of stone, plastic masses, wood, metal or any other suitable material by means of a plane grinding tool which in revolving and at the same time rotating around its geometrical axis at a slow pace causes all parts of its grinding surface, one after the other, to come in contact with the body to be ground in order to obtain a uniform grinding action and to avoid an irregular wear and the formation of grooves in the grinding surface of the tool.

According to my invention the grinding tool has a double motion, it being revolved by being eccentrically connected with a rotating shaft and being further caused to rotate about its own axis by means of a worm gear.

The drawings affixed to this specification show a preferred form of a device according to my invention, Figure 1 being a vertical section, Fig. 2 a plan view, Fig. 3 another vertical section through the device.

The grinding tool $a$ reposing on the cylinder $w$ to be ground is fastened to a socket $b$ having a worm wheel $s$ arranged on its journal $b^2$. The composite head $b'$ of the socket $b$ embraces a disk $c$ being eccentrically fixed on the driving shaft $d$. The lower part of journal $b^2$ is embraced by a rectangular frame $r$ forming slot and crank, the journal $b^2$ carrying a sliding block $t$ gliding in the frame. Frame $r$ is free to oscillate around vertical standard $r^3$, an arm $r'$ and eye $r^2$ connecting it with said standard. A worm $v$ located in bearings $u$ arranged on the side of frame $r$ is driven by means of a jointed coupling $z$ with universal joints inserted.

The driving shaft $d$ in rotating in one direction causes socket $b$ by means of the eccentric disk $c$ to revolve around the axis of shaft $d$. This causes the block $t$ embracing journal $b^2$ to reciprocate in slot $r$ and to impart reciprocating movements to the worm wheel $s$, these movements following a line parallel to the worm $v$ and causing a rolling motion to take place between the worm and the worm wheel. The worm being slowly turned at the same time, there results a gradual rotation of the grinding tool around its geometrical axis, and all the points of the tool are made to work, one after the other, so that a uniform wear results.

I claim:—

1. In a device for grinding cylindrical rotating bodies by means of a plane tool, in combination, a grinding tool, a driving shaft for said tool, means for revolving said tool around an eccentric axis and means for imparting to said tool a non-uniform rotary motion.

2. In a device for grinding cylindrical rotating bodies by means of a plane tool, in combination, a grinding tool, a driving shaft for said tool, an eccentric connecting said grinding tool with said driving shaft, a worm gear adapted to rotate said grinding tool around its own axis and a slot and crank device interposed between said tool and said eccentric, said slot and crank device being adapted to oscillate around a fixed point and carrying the worm forming part of said worm gear.

In testimony whereof I affix my signature in presence of two witnesses.

CARL BLECHER.

Witnesses:
WOLDEMAR HAUPT,
HENRY HASPER.